(12) United States Patent
Olsen

(10) Patent No.: US 10,128,023 B2
(45) Date of Patent: Nov. 13, 2018

(54) WATER BARRIER FOR SUBMARINE POWER CABLE

(71) Applicant: NEXANS, Paris (FR)

(72) Inventor: Espen Olsen, Halden (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 14/467,561

(22) Filed: Aug. 25, 2014

(65) Prior Publication Data

US 2015/0101843 A1 Apr. 16, 2015

(30) Foreign Application Priority Data

Oct. 15, 2013 (EP) .................................... 13306409

(51) Int. Cl.
| | | |
|---|---|---|
| H01B 7/18 | (2006.01) | |
| H01B 7/282 | (2006.01) | |
| H01B 7/285 | (2006.01) | |
| H01B 7/04 | (2006.01) | |

(52) U.S. Cl.
CPC ........... *H01B 7/2825* (2013.01); *H01B 7/045* (2013.01); *H01B 7/285* (2013.01); *Y02A 30/14* (2018.01)

(58) Field of Classification Search
CPC ...... H01B 7/2825; H01B 7/285; H01B 13/32; H01B 13/321; H01B 7/045
USPC ....................................................... 174/109
See application file for complete search history.

(56) References Cited

U.S. PATENT DOCUMENTS

| | | | | |
|---|---|---|---|---|
| 2,881,243 A | * | 4/1959 | Ebel ...................... | H01B 7/2825 156/55 |
| 2,986,486 A | * | 5/1961 | Short ...................... | B29C 63/00 156/56 |
| 3,339,007 A | * | 8/1967 | Blodgett .............. | H01B 7/2825 156/53 |
| 3,588,318 A | * | 6/1971 | Olliss et al. ............. | H01B 3/30 174/110 S |
| 4,256,921 A | * | 3/1981 | Bander ..................... | H01B 9/02 174/102 D |
| 4,360,704 A | * | 11/1982 | Madry ..................... | H01B 9/02 174/102 SC |
| 4,398,058 A | * | 8/1983 | Gerth .................... | H01B 7/2825 174/102 D |
| 4,454,379 A | * | 6/1984 | Cleveland ............ | H01B 7/2825 156/308.6 |
| 4,472,597 A | * | 9/1984 | Uematsu .................. | H01B 9/02 174/106 R |
| 4,481,259 A | * | 11/1984 | Vecellio ............... | H01B 7/2825 174/102 SC |

(Continued)

FOREIGN PATENT DOCUMENTS

| | | |
|---|---|---|
| EP | 0213946 | 10/1988 |
| GB | 510190 | 7/1939 |

OTHER PUBLICATIONS

European Search Report dated Feb. 7, 2014.

*Primary Examiner* — William H Mayo, III
*Assistant Examiner* — Rhadames J Alonzo Miller
(74) *Attorney, Agent, or Firm* — Sofer & Haroun, LLP

(57) ABSTRACT

An cable that is flexible and watertight by means of a metallic water resistant barrier has at least two protective layers 20, 30 of metal tape wound to a cable core 10 with small gaps 50 between each turn of the tape, and where each layer is displaced 50% relative to each other thus covering the gaps in the layers 20, 30, and where the gaps 50 are filled with a water resistant material.

8 Claims, 1 Drawing Sheet

(56) References Cited

U.S. PATENT DOCUMENTS

| | | | | |
|---|---|---|---|---|
| 4,626,619 A | * | 12/1986 | Uematsu | H01B 7/2825 174/106 R |
| 4,703,134 A | * | 10/1987 | Uematsu | H01B 7/285 174/106 R |
| 4,703,997 A | * | 11/1987 | Ijiri | G02B 6/4407 385/109 |
| 4,725,693 A | * | 2/1988 | Hirsch | B32B 15/08 174/106 SC |
| 4,963,695 A | * | 10/1990 | Marciano-Agostinelli | B29C 47/0016 156/48 |
| 5,006,670 A | * | 4/1991 | Plant | H01B 7/2825 174/102 SC |
| 5,010,209 A | * | 4/1991 | Marciano-Agostinelli | H01B 7/2813 174/102 SC |
| 5,043,538 A | * | 8/1991 | Hughey, Jr. | H01B 9/02 156/51 |
| 5,300,733 A | * | 4/1994 | Uematsu | H01B 7/2825 174/106 SC |
| 5,377,290 A | * | 12/1994 | Ohta | G02B 6/4407 385/100 |
| 6,348,236 B1 | * | 2/2002 | Fairgrieve | C09J 7/0217 385/100 |
| 2004/0065456 A1 | * | 4/2004 | Belli | H01B 7/288 174/25 R |
| 2012/0000690 A1 | * | 1/2012 | Van Der Meer | H01B 7/2825 174/102 R |
| 2014/0008098 A1 | * | 1/2014 | Scaglione | H01B 7/18 174/107 |

* cited by examiner

WATER BARRIER FOR SUBMARINE POWER CABLE

RELATED APPLICATION

This application claims the benefit of priority from European Patent Application No. 13 306 409.7, filed Oct. 15, 2013, the entirety of which is incorporated by reference.

BACKGROUND

Field of the Invention

The present invention relates to electrical power cables. More specifically the invention relates to a flexible and watertight metallic water barrier for a submarine power cable.

Description of Related Art

Submarine cables applied for different purposes are well known in the art. Such cables are exposed to harsh environments that may cause damage to the cables if they are not sufficiently protected against water ingress and mechanical force or pressure loads.

Different types of submarine cables exist, e.g. cables for carrying signals and cables for carrying high voltages. Electrical high voltage cables are categorized as medium, high and extra high voltage (MV, MH, EHV) power cables. They are typically designed with a cable core enclosed by a metal sheath making a water tight metallic barrier as well as an outer sheath made in for instance polyethylene (PE). The metal sheath is typically corrugated copper or aluminum sheath and solid copper or aluminum sheath. Submarine cables are used for different applications. Some cables are used for static applications while others are used for dynamic applications.

The present invention belongs to the latter category of power cables, i.e. a power cable that is designed to be used for dynamic applications. An example of a dynamic application is a cable installed on a floating offshore installation. The cable will then be exposed to dynamic forces.

One problem with submarine power cables with metal sheath used for dynamic applications is that they are stiff and vulnerable to movements resulting in poor fatigue properties.

A cable that is constantly moving and exposed external dynamic forces will at some point experience possible fatigue fracture on the outer sheath resulting in possible water ingress in the cable.

Said metal sheath will protect a cable from water ingress, but will make the cable less flexible and thus less usable for dynamic applications. There are however several solutions for making a submarine power cable more flexible while keeping the watertight metallic barrier.

EP-0213946 A2 describes an electrical power cable with a shielding tape with a conductive metal layer on one side. The metal layer has convolutions with a water blocking material. This construction will protect the inner core from water ingress, but the cable will have degraded flexibility, and as mentioned flexibility is an important factor when used in dynamic installations.

High voltage cables comprising a metallic barrier and having good flexible properties for application in dynamic installations have been a big issue and challenge for cable manufactures.

There is a need for a cable that is both watertight and flexible and thus less prone to fatigue.

The present invention has been realized in order to overcome weaknesses with prior art by providing a watertight metallic barrier for a submarine power cable having good flexibility.

OBJECTS AND SUMMARY

The present invention describes a cable that is both watertight and flexible and thus less prone to fatigue. The constriction is well suited for a submarine power cable.

The invention is defined by a cable comprising a cable core enclosed by protective water barriers layers and outer sheath, wherein the protective layers comprise:

a first protective layer comprising a metal tape helically wound to the cable core with small gaps between each turn;

a second protective layer comprising metal tape helically wound to said first protective layer and displaced 50% relative to said first protective layer thus covering said gaps in the first protective layer, and a water resistance material filled in said gaps in the protective layers.

Further aspects of the invention are defined in the dependent claims.

BRIEF DESCRIPTION OF THE DRAWINGS

The invention will now be descried in detail with reference to the figures showing the layered construction of the inventive cable.

DETAILED DESCRIPTION

Figure 1:
FIG. 1 shows a side view the different layers in a cable.
Figure 2:
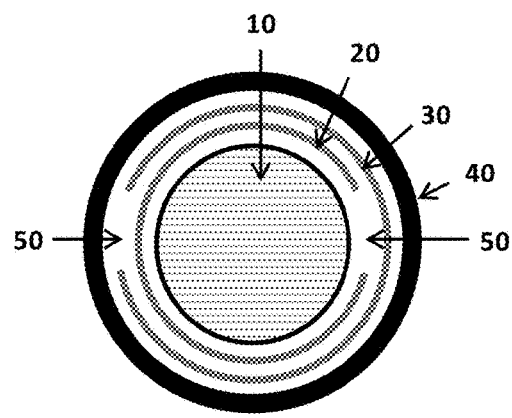
FIG. 2 shows a cross-section of the cable according to the invention.

FIG. 1 shows only one half of a part of the cable cut along the lower dotted line in the figure, while FIG. 2 shows a cross section of a complete cable.

The cable comprises a cable core 10 which is the main element of the cable enabling transportation of power. The cable core 10 is coated with an insulator system (not shown). This insulator system typically comprises a conductor screen, insulation and insulation screen. The cable core 10 with its insulator system is further enclosed in protective water barrier layers and an outer sheath.

In one embodiment the protective water barriers comprises a first and second protective layers 20, 30. These are made of metal tape that is helically wound to the cable core 10 with small gaps 50 between each turn.

The gaps 50 between each turn can vary between 1-10 mm. In one preferred embodiment the gaps 50 are 5 mm wide.

The first protective layer 20 is closest to the core 10 and the second protective layer 30 is wound to the first protective layer 20. It is displaced 50% relative to the first protective layer 20 thus covering said gaps 50 in the first protective layer 20.

In one embodiment of the invention the tape is copper tape. Tape of other materials is also feasible, e.g. aluminum or a mix of tapes where a first layer is Cu-tape and the second layer is Al-tape or vice versa.

The gaps 50 in the protective layers 20, 30 are filled with a water blocking material, i.e. a water resistant material. In one embodiment of the invention the water resistant material is silicon grease. In another embodiment it is hot melted glue.

In one embodiment the water resistant material is applied between each metal layer in addition to the filling in the gaps 50. It is also feasible with different water resistant materials between each layer.

The construction of the protective layers can in another embodiment be expanded to comprise three or more layers for making the water barrier protection even better. This will however make the cable construction somewhat stiffer but it will still be well suited for dynamic applications.

The described inventive cable 10 with its protective layers will provide a cable that is resistant to fatigue over time due to its flexible properties despite having protective metal layers. The invention will overcome weaknesses of prior art by providing a flexible yet watertight metallic barrier. The specific construction is advantageous for submarine power cables for avoiding fatigue over time.

The invention claimed is:

1. A subsea cable comprising:
   a cable core enclosed by a flexible watertight metallic barrier and outer sheath wherein the flexible watertight metallic barrier has:
   a first protective layer of a metal tape helically wound to the cable core with longitudinal gaps between each turn along the longitudinal axis of said cable core, said first protective layer being continuously disposed along the length of the cable at a first distance from a center of said cable;
   a second protective layer of metal tape helically wound entirely on top of and directly contacting said first protective layer, and being continuously disposed along the length of the cable at a second distance from the center of said cable, said second distance being greater than said first distance, said second protective layer having longitudinal gaps between each turn along the longitudinal axis of the cable core and being helically displaced 50% relative to said first protective layer, such that said second protective layer disposed entirely at said second distance from said cable core covers said longitudinal gaps in the first protective layer disposed entirely at said first distance from said cable core, and with said longitudinal gaps in the said second protective layer disposed entirely at said second distance from said cable core are not directly above or overlapping with said longitudinal gaps in said first protective layer disposed entirely at said first distance from said cable core, and
   a water resistant material independent of said outer sheath, said water resistant material being filled into said longitudinal gaps in the first and second protective layers, said water resistant material being a silicone grease or other flexible sealant, said first and second protective layers and said water resistant material there between forming said flexible watertight metallic barrier
   wherein said gaps between helical wraps in said first protective layer and gaps between helical wraps in said second protective layer are each at least 1 mm wide and up to 10 mm wide, sufficient to provide gaps of a dimension to retain said water resistant material therein.

2. A cable according to claim 1, wherein the metal tape of said first protective layer is Cu-tape and wherein the metal tape of said second protective layer is Al-tape.

3. A cable according to claim 1, wherein said gaps are 5 mm wide.

4. A cable according to claim 1, wherein the water resistant material is silicon grease.

5. A cable according to claim 1, wherein the water resistant material is hot melted glue.

6. A cable according to claim 1, wherein said flexible watertight metallic barrier further comprises at least three or more protective layers.

7. A cable according to claim 6, wherein a water resistant material is applied between each protective layer.

8. A cable according to claim 1, wherein said cable core is coated with an insulator system having a conductor screen, insulation, and an insulation screen.

* * * * *